(12) United States Patent
Kodera

(10) Patent No.: US 10,315,689 B2
(45) Date of Patent: Jun. 11, 2019

(54) STEERING MECHANISM CONTROL APPARATUS

(71) Applicant: JTEKT CORPORATION, Osaka-shi, Osaka (JP)

(72) Inventor: Takashi Kodera, Okazaki (JP)

(73) Assignee: JTEKT CORPORATION, Osaka-shi (JP)

( * ) Notice: Subject to any disclaimer, the term of this patent is extended or adjusted under 35 U.S.C. 154(b) by 167 days.

(21) Appl. No.: 15/641,546

(22) Filed: Jul. 5, 2017

(65) Prior Publication Data

US 2018/0015946 A1 Jan. 18, 2018

(30) Foreign Application Priority Data

Jul. 12, 2016 (JP) .................................. 2016-137561

(51) Int. Cl.
| | |
|---|---|
| *B62D 5/00* | (2006.01) |
| *B62D 5/04* | (2006.01) |
| *B62D 6/00* | (2006.01) |
| *B62D 6/10* | (2006.01) |
| *B62D 15/02* | (2006.01) |

(52) U.S. Cl.
CPC ........... *B62D 5/0478* (2013.01); *B62D 5/001* (2013.01); *B62D 5/043* (2013.01); *B62D 6/002* (2013.01); *B62D 6/10* (2013.01); *B62D 15/0245* (2013.01)

(58) Field of Classification Search
CPC ...... B62D 5/0478; B62D 5/001; B62D 5/043; B62D 6/002; B62D 6/10; B62D 15/0245
USPC ............. 701/41, 43; 180/280, 402, 441, 446
See application file for complete search history.

(56) References Cited

U.S. PATENT DOCUMENTS

| | | | | |
|---|---|---|---|---|
| 2008/0183354 A1* | 7/2008 | Higashi | .................. | B62D 5/003 701/43 |
| 2008/0230300 A1* | 9/2008 | Hara | ..................... | B62D 6/008 180/402 |
| 2014/0209403 A1* | 7/2014 | Ogi | .......................... | B62D 1/16 180/280 |

(Continued)

FOREIGN PATENT DOCUMENTS

| | | |
|---|---|---|
| DE | 10034135 C1 | 10/2001 |
| JP | 2013-043551 A | 3/2013 |

OTHER PUBLICATIONS

Feb. 7, 2018 Extended Search Report issued in European Patent Application No. 17180177.2.

*Primary Examiner* — Thomas G Black
*Assistant Examiner* — Wae L Louie
(74) *Attorney, Agent, or Firm* — Oliff PLC

(57) ABSTRACT

A correction circuit receives a steering torque and an electric signal indicative of an operating state of a clutch. The correction circuit selectively uses a first correction value and a second correction value in accordance with the operating state of the clutch. The first correction value is set to correct deviation of the steering torque relative to its zero point when an exciting coil of the clutch is not energized. The second correction value is set to correct deviation of the steering torque relative to its zero point, caused by magnetic flux generated by energization of the exciting coil of the clutch. Adding the first correction value or the second correction value to the steering torque in accordance with the operating state of the clutch suitably corrects deviation of the steering torque relative to its zero point in accordance with the operating state of the clutch.

8 Claims, 9 Drawing Sheets

(56) References Cited

U.S. PATENT DOCUMENTS

| | | | |
|---|---|---|---|
| 2016/0159388 A1* | 6/2016 | Sekiya | B62D 5/0409 |
| | | | 180/446 |
| 2016/0347356 A1* | 12/2016 | Matsuda | B62D 5/0433 |
| 2016/0375930 A1* | 12/2016 | Arima | B62D 3/14 |
| | | | 180/441 |
| 2018/0015946 A1* | 1/2018 | Kodera | B62D 5/043 |
| 2018/0237004 A1* | 8/2018 | Nasu | B60W 30/045 |
| 2018/0237064 A1* | 8/2018 | Nasu | B62D 9/002 |

* cited by examiner

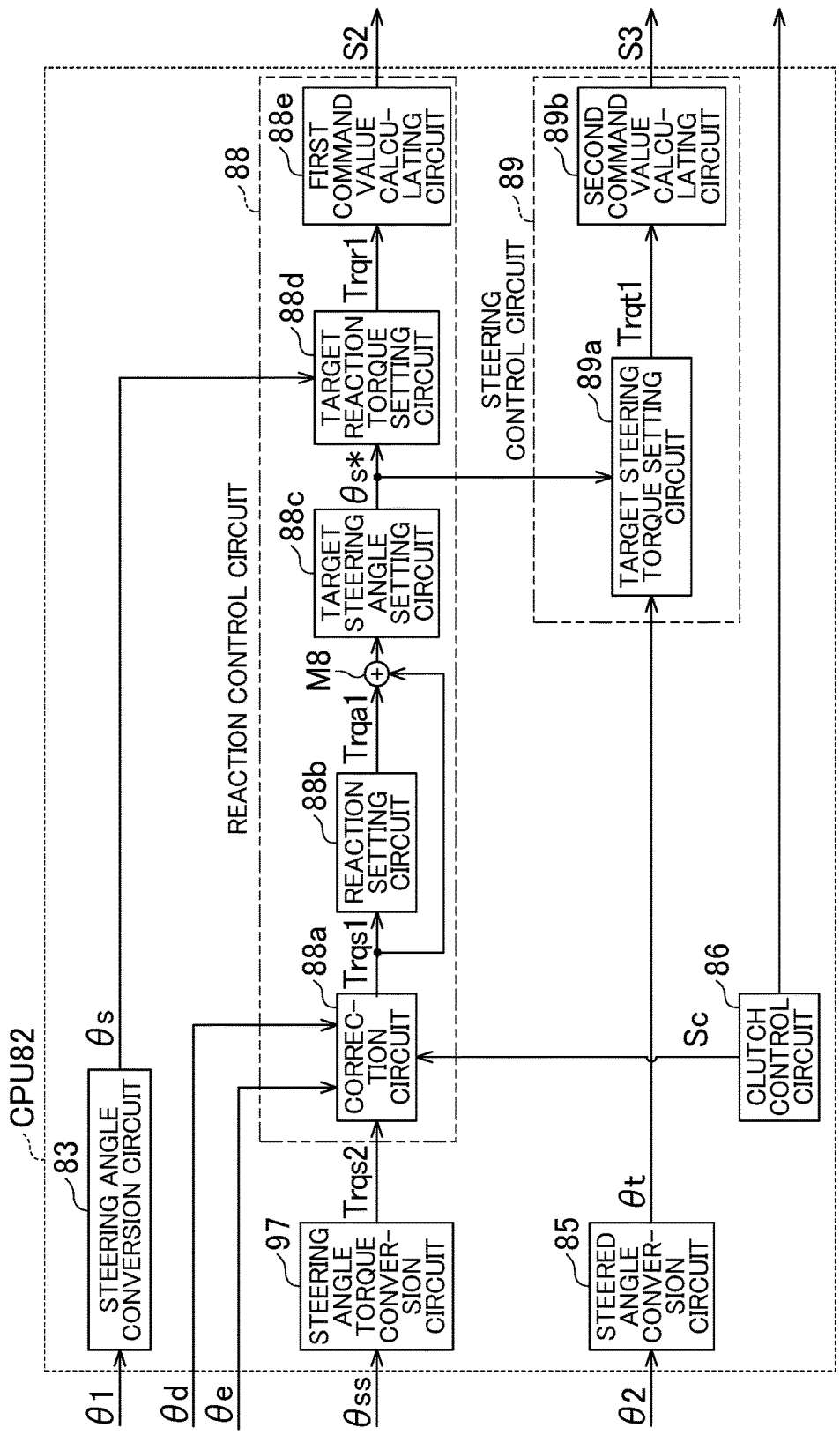

STEERING MECHANISM CONTROL APPARATUS

INCORPORATION BY REFERENCE

The disclosure of Japanese Patent Application No. 2016-137561 filed on Jul. 12, 2016, including the specification, drawings and abstract, is incorporated herein by reference in its entirety.

BACKGROUND OF THE INVENTION

1. Field of the Invention

The invention relates to steering mechanism control apparatuses.

2. Description of the Related Art

As described in Japanese Patent Application Publication No. 2013-43551 (JP 2013-43551 A), a steer-by-wire system that mechanically separates a steering wheel from steered wheels is known in the related art. A steer-by-wire system will hereinafter be referred to as an "SBW system". An SBW system usually includes: a clutch to connect and disconnect a power transmission path between a steering wheel and steered wheels; a reaction motor that is a source of steering reaction to be applied to a steering shaft; a steering motor that is a source of steering force to steer the steered wheels; and a control apparatus. During travel of a vehicle, the control apparatus disengages the clutch so as to maintain mechanical separation between the steering wheel and the steered wheels. During travel of the vehicle, the control apparatus controls driving of the reaction motor and the steering motor in response to a steering state. When the reaction motor, for example, is in an abnormal condition or the power of the vehicle is turned off, the control apparatus engages the clutch with a view to providing fail-safe operation, for example.

An SBW system control apparatus described in JP 2013-43551 A determines whether the temperature of a steering motor is higher than a preset clutch engagement temperature. Upon determining that the temperature of the steering motor is higher than the clutch engagement temperature, the control apparatus changes the clutch from a disengaged state to an engaged state. The control apparatus subsequently continuously controls driving of the steering motor in response to an operation performed on the steering wheel. This makes it possible to prevent an increase in steering torque that will be a burden on a driver, unlike a situation where driving of the steering motor stops when the steering motor is overheating.

The control apparatus outputs a current to the clutch in changing the clutch from the disengaged state to the engaged state. This causes generation of magnetic flux from the clutch. The magnetic flux that acts as noise may enter, for example, a torque sensor. In this case, an electric signal generated by the torque sensor is influenced by the magnetic flux, so that a steering force applied to the steering wheel may differ from an intended steering force responsive to an operation performed on the steering wheel. Thus, the driver's steering feel may deteriorate.

SUMMARY OF THE INVENTION

An object of the invention is to provide a steering mechanism control apparatus that gives a driver improved steering feel, irrespective of whether a clutch is in an engaged state or a disengaged state.

An aspect of the invention provides a control apparatus for controlling a steering mechanism. The steering mechanism includes an electromagnetic clutch, a reaction motor, and a steering motor. The electromagnetic clutch is configured to connect and disconnect a power transmission path between a steering wheel and a steered wheel in response to whether power is supplied to the electromagnetic clutch. The reaction motor is configured to generate a steering reaction. The steering reaction is a torque to be applied to a portion of the power transmission path between the steering wheel and the electromagnetic clutch in a direction opposite to a steering direction. The steering motor is configured to generate a steering force. The steering force is power to be applied to a portion of the power transmission path between the electromagnetic clutch and the steered wheel so as to steer the steered wheel. The control apparatus includes a plurality of control circuits and a memory. The plurality of control circuits are configured to control supply of power to each of the electromagnetic clutch, the reaction motor, and the steering motor. The plurality of control circuits are configured to calculate a current command value for at least one of the reaction motor and the steering motor in accordance with a quantity of state indicative of a steering state of the steering wheel magnetically detected by a sensor provided for the steering mechanism. The memory stores a first correction value set so as to reduce deviation of the quantity of state relative to a zero point of the quantity of state when the electromagnetic clutch is in an engaged state, and a second correction value set so as to reduce deviation of the quantity of state relative to the zero point of the quantity of state when the electromagnetic clutch is in a disengaged state. The plurality of control circuits include a correction circuit to correct the quantity of state using the first correction value when the electromagnetic clutch is in the engaged state, and correct the quantity of state using the second correction value when the electromagnetic clutch is in the disengaged state.

Magnetic flux may be generated from the electromagnetic clutch, and the magnetic flux may act as noise on the sensor. In such a case, the quantity of state magnetically detected by the sensor, and eventually, the command value calculated in accordance with the quantity of state will be influenced by the magnetic flux from the electromagnetic clutch. This may unfortunately prevent an intended steering reaction responsive to an operation performed on the steering wheel from being applied to the steering wheel.

In this regard, the above configuration enables a suitable zero-point correction to be made to the quantity of state in accordance with the operating state of the electromagnetic clutch. Regardless of whether the electromagnetic clutch is in the engaged state or the disengaged state, the quantity of state influenced by noise is corrected by the correction circuit using the first or second correction value. The quantity of state corrected is less influenced by the magnetic flux generated from the electromagnetic clutch. Thus, the command value calculated in accordance with the quantity of state corrected is also less influenced by the magnetic flux generated from the electromagnetic clutch. Driving the reaction motor in accordance with the command value enables a suitable steering reaction responsive to an operation performed on the steering wheel to be applied to the steering wheel. Consequently, regardless of whether the clutch is in the engaged state or the disengaged state, the above configuration provides improved steering feel to the driver.

BRIEF DESCRIPTION OF THE DRAWINGS

The foregoing and further features and advantages of the invention will become apparent from the following descrip

FIG. 6 is a block diagram illustrating the functional configuration of a control apparatus according to a second embodiment of the invention;

DETAILED DESCRIPTION OF EMBODIMENTS

A steering mechanism control apparatus according to a first embodiment of the invention will be described below. The control apparatus according to the first embodiment is configured to control a steer-by-wire steering mechanism.

Figure 1:
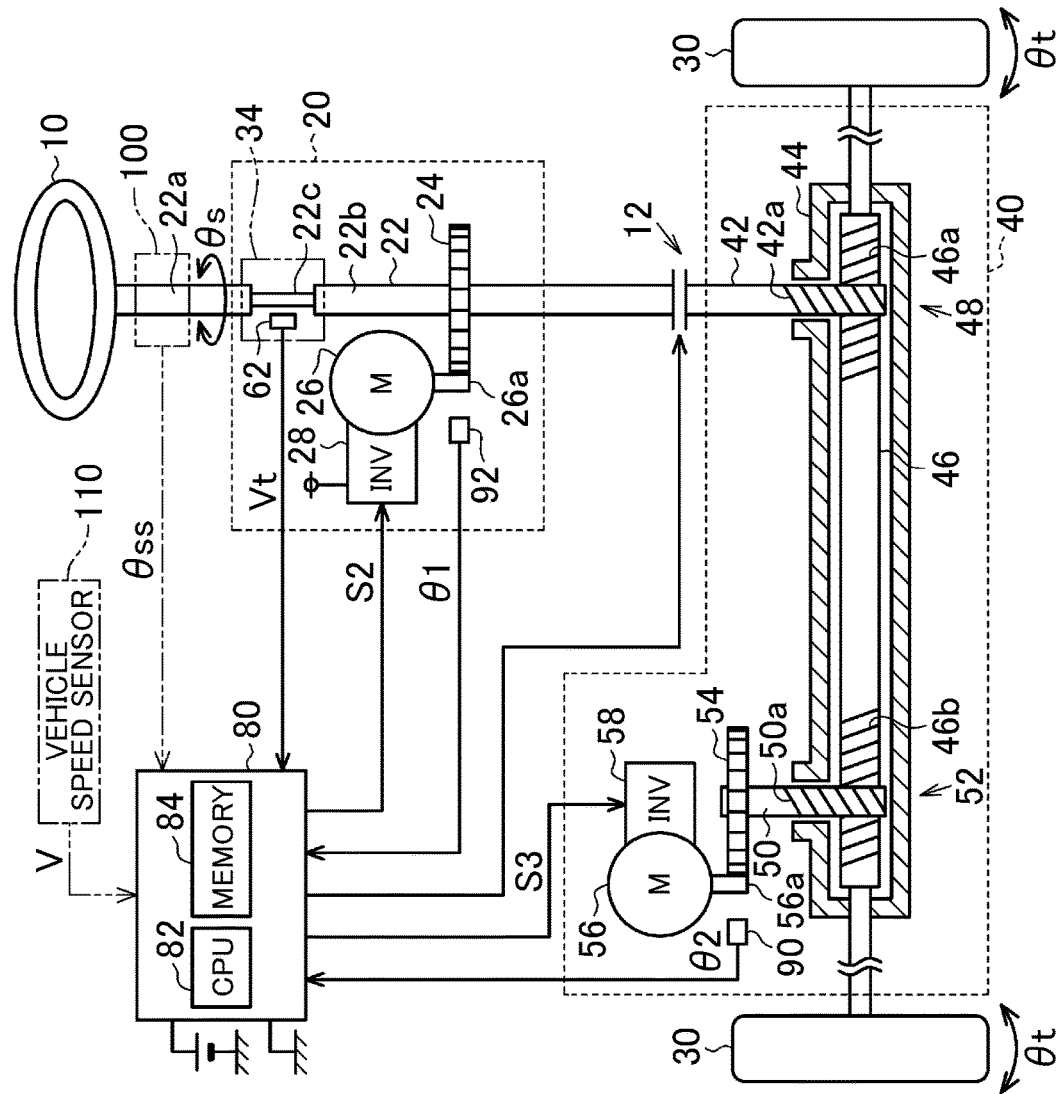
- FIG. 1 is a schematic diagram illustrating a control apparatus for a steering mechanism according to a first embodiment of the invention.

As illustrated in FIG. 1, the steering mechanism includes a reaction actuator 20, a steering actuator 40, a clutch 12, and a control apparatus 80. The reaction actuator 20 includes a steering shaft 22, a reaction side reduction mechanism 24, a reaction motor 26, a reaction side inverter 28, and a torque sensor 94. The reaction motor 26 includes a rotation shaft 26a.

The steering shaft 22 includes an input shaft 22a, an output shaft 22b, and a torsion bar 22c. The upper end of the input shaft 22a is connected to a steering wheel 10. The lower end of the input shaft 22a is coupled to the output shaft 22b through the torsion bar 22c. The torsion bar 22c is twisted in accordance with a difference between a torque applied to the input shaft 22a and a torque applied to the output shaft 22b.

A three-phase brushless motor, for example, is used as the reaction motor 26. The rotation shaft 26a of the reaction motor 26 is coupled to the steering shaft 22 through the reaction side reduction mechanism 24. The reaction motor 26 is connected to a battery through the reaction side inverter 28. The reaction side inverter 28 converts DC power of the battery into three-phase AC power. A rotation angle sensor 92 is provided for the reaction motor 26. The rotation angle sensor 92 is configured to detect a rotation angle of the rotation shaft 26a. A rotation angle θ1 of the rotation shaft 26a of the reaction motor 26 detected by the rotation angle sensor 92 is used to calculate a steering angle θs of the steering wheel 10. The rotation shaft 26a of the reaction motor 26 and the steering shaft 22 operate in conjunction with each other through the reaction side reduction mechanism 24. This means that there is a correlation between the rotation angle θ1 of the rotation shaft 26a and the rotation angle of the steering shaft 22, and there is also a correlation between the rotation angle θ1 of the rotation shaft 26a and the steering angle θs (i.e., the rotation angle of the steering wheel 10). Accordingly, the steering angle θs is determined in accordance with the rotation angle θ1 of the rotation shaft 26a of the reaction motor 26.

The torque sensor 94 is provided on a portion of the steering shaft 22 between the steering wheel 10 and the reaction side reduction mechanism 24. The torque sensor 94 is configured to generate a voltage signal Vt responsive to the amount of torsion of the torsion bar 22c. The torque sensor 94 includes: a cylindrical permanent magnet (not illustrated) attached to the input shaft 22a; a pair of magnetic yokes (not illustrated) attached to the output shaft 22b such that the magnetic yokes surround the permanent magnet; and a magnetic sensor 62 to detect magnetic flux generated between the pair of magnetic yokes. The magnetic sensor 62 may be a Hall sensor, for example. The magnetic flux generated between the pair of magnetic yokes changes in accordance with the amount of torsion of the torsion bar 22c. Torsion of the torsion bar 22c caused by an operation performed on the steering wheel 10 changes magnetic flux applied to the magnetic sensor 62. The magnetic sensor 62 is configured to generate the voltage signal Vt responsive to a change in magnetic flux.

The steering actuator 40 includes a first rack and pinion mechanism 48, a second rack and pinion mechanism 52, a steering side reduction gear 54, a steering motor 56, and a steering side inverter 58. The steering motor 56 includes a rotation shaft 56a.

The first rack and pinion mechanism 48 includes a rack shaft 46 and a pinion shaft 42. The rack shaft 46 and the pinion shaft 42 cross each other. The rack shaft 46 is provided with first rack teeth 46a. The pinion shaft 42 is provided with pinion teeth 42a. The first rack teeth 46a are in engagement with the pinion teeth 42a.

The second rack and pinion mechanism 52 includes the rack shaft 46 and a pinion shaft 50. The rack shaft 46 and the pinion shaft 50 cross each other. The rack shaft 46 is provided with second rack teeth 46b. The pinion shaft 50 is provided with pinion teeth 50a. The second rack teeth 46b are in engagement with the pinion teeth 50a. The pinion shaft 50 is coupled to the rotation shaft 56a of the steering motor 56 through the steering side reduction gear 54.

A three-phase brushless motor, for example, is used as the steering motor 56. The steering motor 56 is connected to a battery through the steering side inverter 58. The steering side inverter 58 converts DC power of the battery into three-phase AC power. A rotation angle sensor 90 is provided for the steering motor 56. The rotation angle sensor 90 is configured to detect a rotation angle of the rotation shaft 56a. A rotation angle θ2 of the rotation shaft 56a of the steering motor 56 detected by the rotation angle sensor 90 is used to calculate a steered angle θt of steered wheels 30.

The rotation shaft 56a of the steering motor 56 operates in conjunction with the steered wheels 30 through the steering side reduction gear 54, the pinion shaft 50, and the rack shaft 46. This means that there is a correlation between the rotation angle θ2 of the rotation shaft 56a and the steered angle θt. Accordingly, the steered angle θt is determined in accordance with the rotation angle θ2 of the rotation shaft 56a of the steering motor 56.

The rack shaft 46 is housed in a rack housing 44. The ends of the rack shaft 46 are each coupled to an associated one of the steered wheels 30 via a tie rod. The clutch 12 is provided between the steering shaft 22 (or more precisely, the output shaft 22b) and the pinion shaft 42. An electromagnetic clutch, for example, is used as the clutch 12. The electromagnetic clutch is configured so that energizing and de-energizing an exciting coil (not illustrated) of the electromagnetic clutch connects and disconnects a power transmission path between the steering shaft 22 and the pinion shaft 42. Disengagement of the clutch 12 mechanically disconnects a power transmission path between the steering wheel 10 and the steered wheels 30. Engagement of the clutch 12 mechanically connects the power transmission path between the steering wheel 10 and the steered wheels 30. Energization of the exciting coil maintains the clutch 12 in a disengaged state where the power transmission path between the steering shaft 22 and the pinion shaft 42 is mechanically disconnected.

The control apparatus 80 controls the reaction motor 26 so as to cause the reaction motor 26 to generate a steering reaction responsive to an operation performed on the steering wheel 10 (reaction control). The control apparatus 80 controls the steering motor 56 so as to cause the steering motor 56 to steer the steered wheels 30 in response to an operation performed on the steering wheel 10 (steering control). The control apparatus 80 includes a central processing unit (CPU) 82 and a memory 84. The CPU 82 executes program(s) stored in the memory 84 so as to control the reaction motor 26 and the steering motor 56.

The CPU 82 receives the rotation angle θ1 of the rotation shaft 26a of the reaction motor 26 detected by the rotation angle sensor 92, and the voltage signal Vt generated by the torque sensor 94. The CPU 82 controls the reaction motor 26 in accordance with the rotation angle θ1 and the voltage signal Vt. The CPU 82 further receives the rotation angle θ2 of the rotation shaft 56a of the steering motor 56 detected by the rotation angle sensor 90. The CPU 82 controls the steering motor 56 in accordance with the rotation angle θ2 and the voltage signal Vt.

The memory 84 further stores a first correction value Td and a second correction value Te. The first and second correction values Td and Te are offset correction values. The first and second correction values Td and Te are each used to make a zero-point correction to a steering torque. The first correction value Td is a correction value to offset the zero point of a steering torque when the clutch 12 is in an engaged state, i.e., when no magnetic flux from the clutch 12 enters the magnetic sensor 62 of the torque sensor 94. The second correction value Te is a correction value to offset the zero point of a steering torque when the clutch 12 is in the disengaged state, i.e., when magnetic flux resulting from energization of the exciting coil of the clutch 12 is applied to the torque sensor 94. The two correction values are set for the reasons described below.

Figure 2:
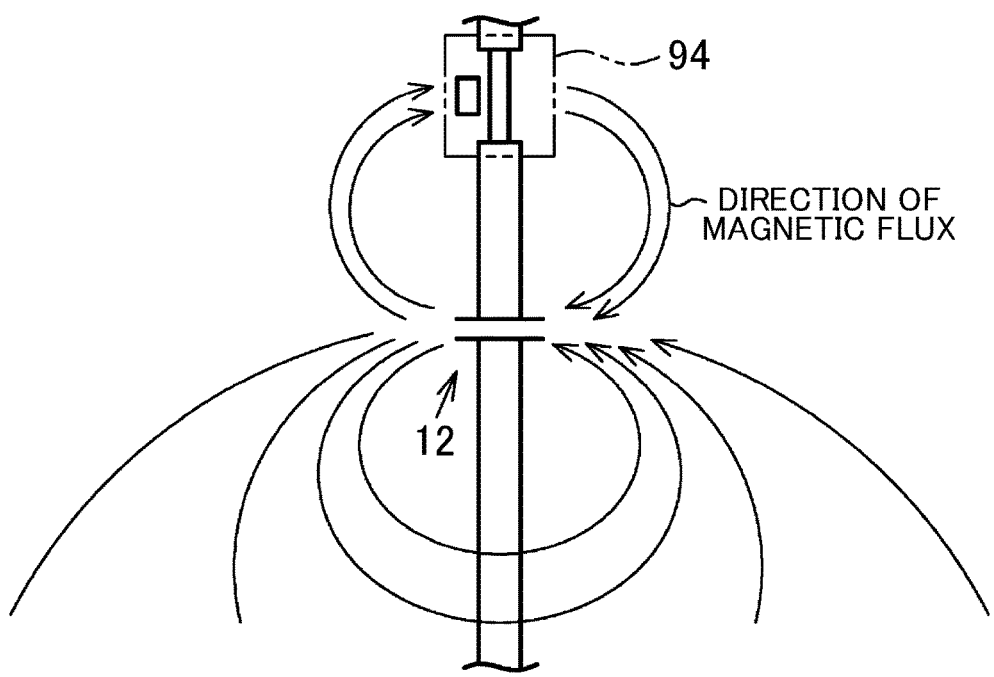
FIG. 2 is a schematic diagram illustrating the direction of magnetic flux generated from a clutch according to the first embodiment.

As illustrated in FIG. 2, energization of the exciting coil of the clutch 12 may cause generation of magnetic flux from the exciting coil, and the magnetic flux may be applied to the torque sensor 94. In this case, the voltage signal Vt changes owing not only to the individuality of the magnetic sensor 62 but also to influence of the magnetic flux from the exciting coil. When the exciting coil of the clutch 12 is not energized, the voltage signal Vt deviates relative to its zero point owing to the individuality of the magnetic sensor 62. Thus, the amount of deviation of a steering torque relative to its zero point when magnetic flux is applied to the torque sensor 94 differs from the amount of deviation of a steering torque relative to its zero point when no magnetic flux is applied to the torque sensor 94. Accordingly, a steering torque Trqs is preferably corrected in accordance with the on/off state of the clutch 12.

Figure 3:
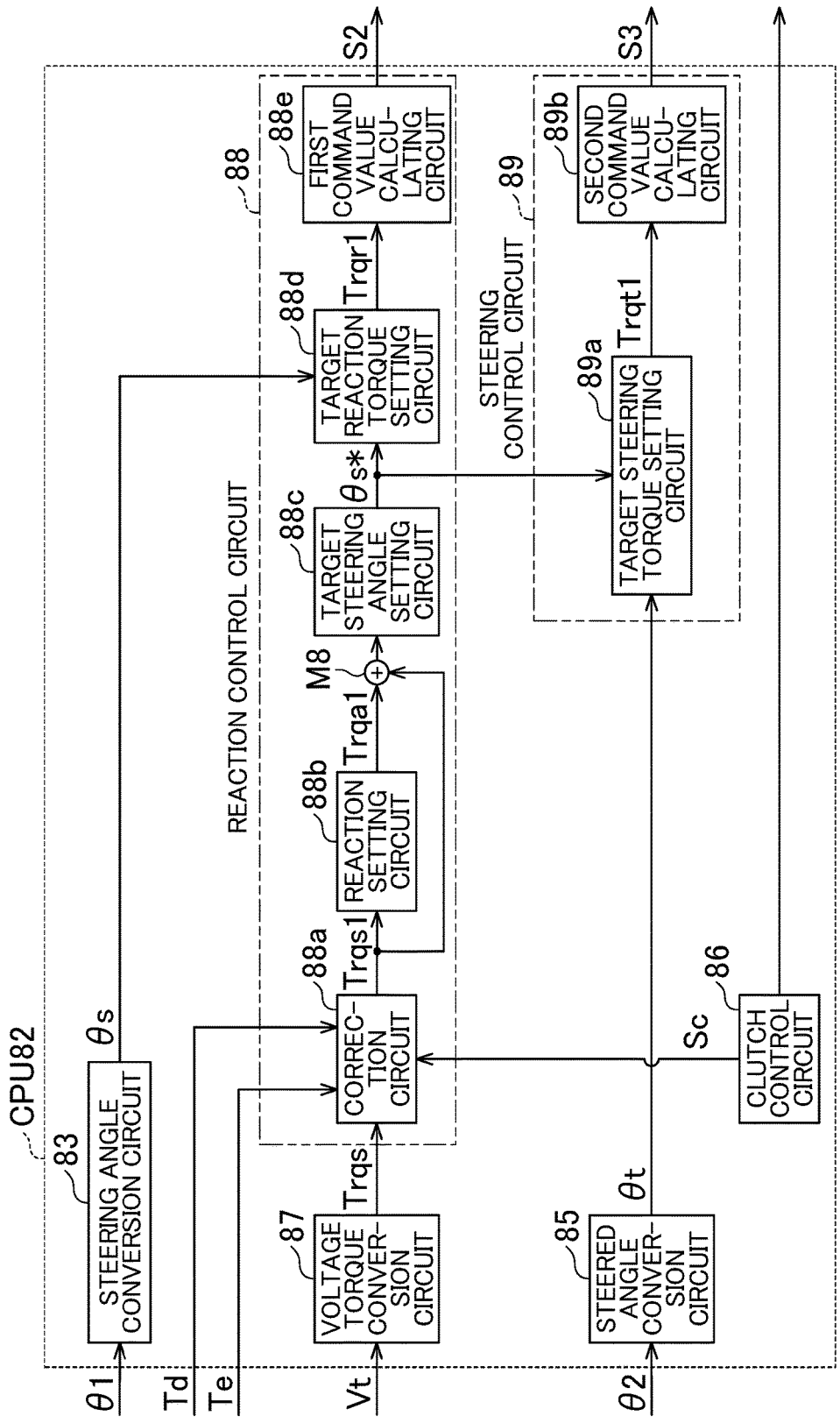
FIG. 3 is a block diagram illustrating the functional configuration of a CPU of the control apparatus according to the first embodiment.

The CPU 82 will be described in detail below. As illustrated in FIG. 3, the CPU 82 includes a steering angle conversion circuit 83, a steered angle conversion circuit 85, a voltage torque conversion circuit 87, a clutch control circuit 86, a reaction control circuit 88, and a steering control circuit 89. The clutch control circuit 86, the reaction control circuit 88, and the steering control circuit 89 control supply of power to the clutch 12, the reaction actuator 20, and the steering actuator 40, respectively.

The steering angle conversion circuit 83 receives the rotation angle θ1 of the rotation shaft 26a of the reaction motor 26 detected by the rotation angle sensor 92. The steering angle conversion circuit 83 calculates the steering angle θs of the steering wheel 10 in accordance with the rotation angle θ1 received.

The steered angle conversion circuit 85 receives the rotation angle θ2 of the rotation shaft 56a of the steering motor 56 detected by the rotation angle sensor 90. The steered angle conversion circuit 85 calculates the steered angle θt of the steered wheels 30 in accordance with the rotation angle θ2 received.

The clutch control circuit 86 carries out control such that the clutch 12 is switched between a connected state and a disconnected state in response to turning on or off of an ignition switch (not illustrated). In other words, the clutch control circuit 86 controls supply of power to the clutch 12. The ignition switch will be abbreviated as an "IGSW". In one example, when the IGSW is turned on, the clutch control circuit 86 energizes the exciting coil of the clutch 12 so as to switch the clutch 12 from the connected state (i.e., the engaged state) to the disconnected state (i.e., the disengaged state). When the IGSW is turned off, the clutch control circuit 86 stops energizing the exciting coil of the clutch 12 so as to switch the clutch 12 from the disconnected state (i.e., the disengaged state) to the connected state (i.e., the engaged state). The clutch control circuit 86 generates an electric signal Sc indicative of whether the clutch 12 is in the connected state or the disconnected state (i.e., indicative of whether the clutch 12 is in the engaged state or the disengaged state), and outputs the electric signal Sc to the reaction control circuit 88. The amount of energization to the clutch 12 induced by the clutch control circuit 86 is constant.

In accordance with the voltage signal Vt output from the magnetic sensor 62 of the torque sensor 94, the voltage torque conversion circuit 87 calculates the steering torque Trqs to be applied to the steering shaft 22. The steering torque Trqs calculated by the voltage torque conversion circuit 87 increases as the voltage signal Vt increases in value.

In accordance with the steering torque Trqs calculated by the voltage torque conversion circuit 87, the reaction control circuit 88 controls supply of power to the reaction motor 26 through the reaction side inverter 28. The reaction control circuit 88 includes a correction circuit 88a, a reaction setting circuit 88b, an adding circuit M8, a target steering angle setting circuit 88c, a target reaction torque setting circuit 88d, and a first command value calculating circuit 88e.

The correction circuit 88a functions to make an offset correction to deviation of the steering torque Trqs caused by magnetic flux when the exciting coil of the clutch 12 is energized. The correction circuit 88a receives the steering torque Trqs calculated by the voltage torque conversion circuit 87, and the electric signal Sc generated by the clutch control circuit 86 and indicative of whether the clutch 12 is in the connected state or the disconnected state. In accordance with the operating state of the clutch 12 indicated by the electric signal Sc received, the correction circuit 88a reads the first correction value Td or the second correction value Te stored in the memory 84. The correction circuit 88a calculates a corrected steering torque Trqs1 using the steering torque Trqs received and the first correction value Td or the second correction value Te read.

In accordance with the corrected steering torque Trqs1 calculated by the correction circuit 88a, the reaction setting circuit 88b calculates a reaction torque Trqa1. The reaction torque Trqa1 calculated increases in value as the corrected steering torque Trqs1 increases. The adding circuit M8 adds the corrected steering torque Trqs1 to the reaction torque Trqa1.

In accordance with the value obtained by adding the corrected steering torque Trqs1 to the reaction torque Trqa1 by the adding circuit M8, the target steering angle setting circuit 88c calculates a target steering angle θs*. The target reaction torque setting circuit 88d receives the target steering angle θs* calculated by the target steering angle setting circuit 88c, and the steering angle θs calculated by the steering angle conversion circuit 83. The target reaction torque setting circuit 88d calculates a target reaction torque Trqr1 that is a target value for a reaction torque to be generated by the reaction motor 26. The target reaction torque Trqr1 is a manipulated variable used to make the steering angle θs, calculated by the steering angle conversion circuit 83, correspond to the target steering angle θs*.

The first command value calculating circuit 88e receives the target reaction torque Trqr1 calculated by the target reaction torque setting circuit 88d. In accordance with the target reaction torque Trqr1 received, the first command value calculating circuit 88e calculates a command signal S2 to drive the reaction motor 26. The reaction side inverter 28 operates in accordance with the command signal S2. The reaction motor 26 receives power through the reaction side inverter 28 so as to generate a torque responsive to the target reaction torque Trqr1. A steering reaction responsive to the torque generated by the reaction motor 26 is applied to the steering shaft 22.

The steering control circuit 89 controls supply of power to the steering motor 56. Specifically, the steering control circuit 89 carries out steering control involving controlling driving of the steering motor 56 so as to steer the steered wheels 30 in accordance with how the steering wheel 10 is operated. The steering control circuit 89 includes a target steering torque setting circuit 89a and a second command value calculating circuit 89b.

The target steering torque setting circuit 89a receives the steered angle θt calculated by the steered angle conversion circuit 85, and the target steering angle θs* calculated by the target steering angle setting circuit 88c of the reaction control circuit 88. In accordance with the target steering angle θs*, the target steering torque setting circuit 89a calculates a target steered angle. The target steering torque setting circuit 89a calculates a target steering torque Trqt1 that is a target value for a steering torque to be generated by the steering motor 56. The target steering torque Trqt1 is a manipulated variable used to make the steered angle θt, calculated by the steered angle conversion circuit 85, correspond to the target steered angle.

The second command value calculating circuit 89b receives the target steering torque Trqt1 calculated by the target steering torque setting circuit 89a. In accordance with the target steering torque Trqt1 received, the second command value calculating circuit 89b calculates a command signal S3 to drive the steering motor 56. The steering side inverter 58 operates in accordance with the command signal S3. The steering motor 56 receives power through the steering side inverter 58 so as to generate a torque responsive to the target steering torque Trqt1. The second rack and pinion mechanism 52 converts the torque generated by the steering motor 56 into a force to be exerted in the axial direction of the rack shaft 46. The force exerted in the axial direction is applied to the rack shaft 46 so as to move the rack shaft 46 in the axial direction. The movement of the rack shaft 46 steers the steered wheels 30.

Figure 4:
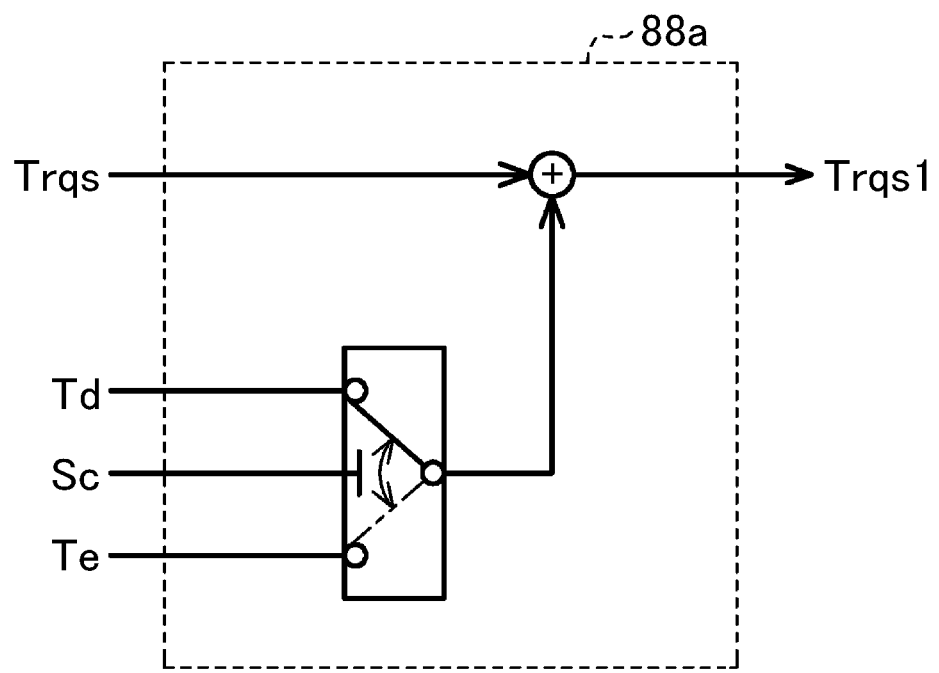
FIG. 4 is a block diagram illustrating the functional configuration of a correction circuit according to the first embodiment.

The correction circuit 88a will be described in detail below. As illustrated in FIG. 4, the correction circuit 88a selectively uses the first correction value Td and the second correction value Te, stored in the memory 84, in accordance with the electric signal Sc indicative of whether the clutch 12 is in the connected state or the disconnected state.

For example, when the clutch 12 is mechanically disconnected (i.e., when the clutch 12 is in the disengaged state), the correction circuit 88a reads the second correction value Te from the memory 84. In this case, the correction circuit 88a adds the second correction value Te to the steering torque Trqs calculated by the voltage torque conversion circuit 87. When the clutch 12 is mechanically connected (i.e., when the clutch 12 is in the engaged state), the correction circuit 88a reads the first correction value Td from the memory 84. In this case, the correction circuit 88a adds the first correction value Td to the steering torque Trqs calculated by the voltage torque conversion circuit 87.

The first correction value Td and the second correction value Te are set as described below. With the steering wheel 10 held at a neutral position, setting the first correction value Td involves experimentally determining how much the steering torque Trqs, calculated in accordance with the voltage signal Vt output from the torque sensor 94, deviates relative to its zero point when the clutch 12 is in the engaged state. With the steering wheel 10 held at the neutral position, setting the second correction value Te involves experimentally determining how much the steering torque Trqs, calculated in accordance with the voltage signal Vt output from the torque sensor 94, deviates relative to its zero point when the clutch 12 is in the disengaged state. Specifically, the first correction value Td is set with a view to reducing or eliminating deviation of the steering torque Trqs relative to the zero point, resulting from the individuality of the magnetic sensor 62 of the torque sensor 94. The second correction value Te is set with a view to reducing or eliminating deviation of the steering torque Trqs relative to the zero point, resulting from the individuality of the magnetic sensor 62 of the torque sensor 94 and magnetic flux generated from the exciting coil of the clutch 12.

With the steering wheel 10 held at the neutral position and the clutch 12 in the engaged state, the value of the voltage signal Vt, generated by the magnetic sensor 62, deviates in the negative direction relative to its zero point owing to the individuality of the magnetic sensor 62. In this case, the steering torque Trqs calculated in accordance with the voltage signal Vt deviates in the negative direction in response to the amount of deviation of the voltage signal Vt relative to its zero point. Accordingly, the first correction value Td is set to be a positive offset correction value that increases the value of the steering torque Trqs, deviated in the negative direction relative to the zero point of the steering torque, in such a manner that the value of the steering torque Trqs shifts in the positive direction by the amount of deviation of the steering torque responsive to the voltage signal Vt.

With the steering wheel 10 held at the neutral position and the clutch 12 in the disengaged state, the value of the voltage signal Vt, generated by the magnetic sensor 62, deviates in the positive direction relative to its zero point owing to the individuality of the magnetic sensor 62 and influence of magnetic flux generated from the exciting coil of the clutch 12. In this case, the steering torque Trqs calculated in accordance with the voltage signal Vt deviates in the positive direction in response to the amount of deviation of the voltage signal Vt relative to its zero point. Accordingly, the second correction value Te is set to be a negative offset correction value that reduces the value of the steering torque Trqs, deviated in the positive direction relative to the zero point of the steering torque, in such a manner that the value of the steering torque Trqs shifts in the negative direction by the amount of deviation of the steering torque responsive to the voltage signal Vt.

Figure 5A:
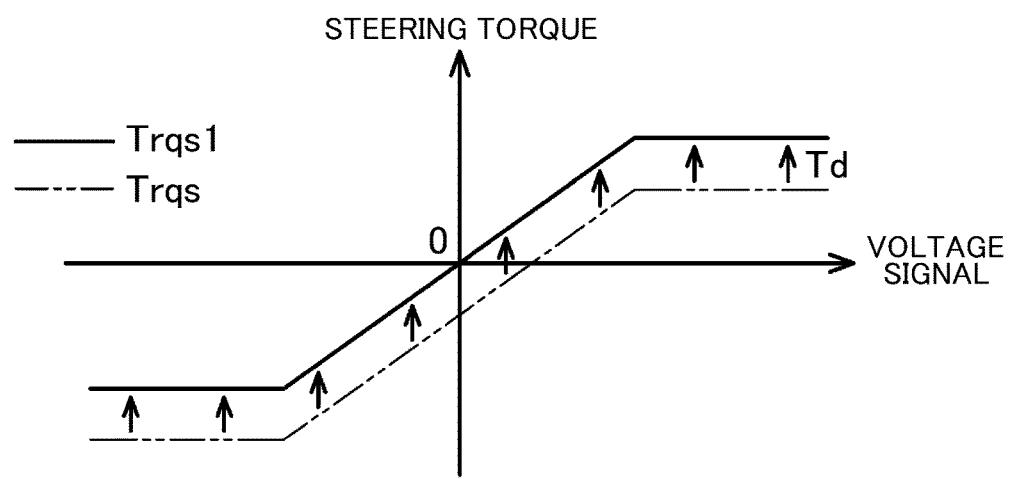
FIG. 5A is a graph illustrating steering torque output characteristics obtained before and after an offset correction is made, with the clutch according to the first embodiment in an engaged state.

As illustrated in FIG. 5A, with the clutch 12 in the engaged state, the first correction value Td is added to the steering torque Trqs so as to make an offset correction to the steering torque Trqs. The first correction value Td is a positive value responsive to the amount of deviation of the steering torque in the negative direction, caused by influence of the individuality of the magnetic sensor 62. Thus, adding the first correction value Td to the steering torque Trqs, calculated by the voltage torque conversion circuit 87, reduces deviation of the steering torque in the negative direction, resulting from the individuality of the magnetic sensor 62. This provides the corrected steering torque Trqs1.

Figure 5B:
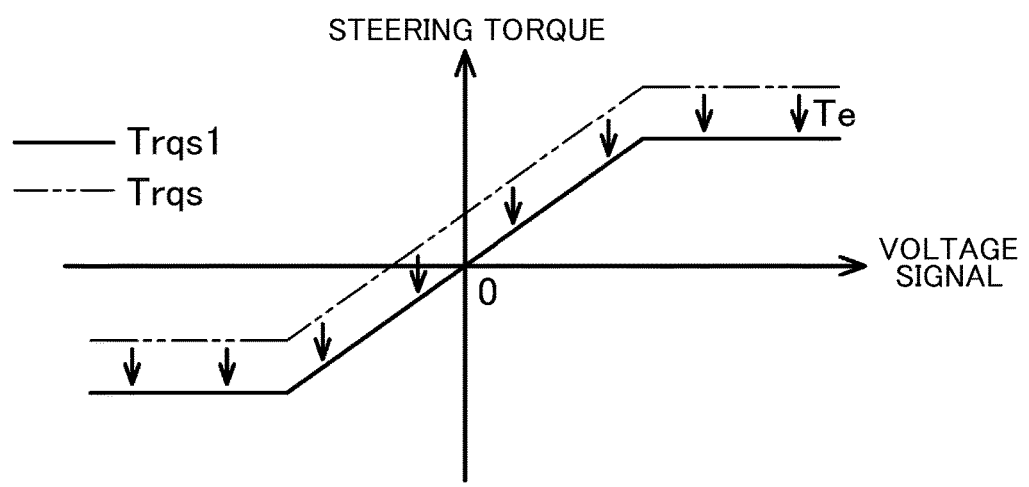
FIG. 5B is a graph illustrating steering torque output characteristics obtained before and after an offset correction is made, with the clutch according to the first embodiment in a disengaged state.

As illustrated in FIG. 5B, with the clutch 12 mechanically disconnected, the second correction value Te is added to the steering torque Trqs so as to make an offset correction to the steering torque Trqs. The second correction value Te is a negative value responsive to the amount of deviation of the steering torque in the positive direction, caused by the individuality of the magnetic sensor 62 and influence of magnetic flux generated from the exciting coil of the clutch 12. Thus, adding the second correction value Te to the steering torque Trqs, calculated by the voltage torque conversion circuit 87, reduces deviation of the steering torque in the positive direction, resulting from the individuality of the magnetic sensor 62 and magnetic flux generated from the exciting coil of the clutch 12. This provides the corrected steering torque Trqs1.

The embodiment described in detail above achieves effects described below.

(1) A zero-point correction is suitably made to the steering torque in accordance with the operating state of the clutch 12. Regardless of whether the clutch 12 is in the engaged state or the disengaged state, the corrected steering torque Trqs1 calculated by the correction circuit 88a is less influenced by the individuality of the magnetic sensor 62 and magnetic flux generated from the exciting coil of the clutch 12. Thus, the target reaction torque Trqr1 calculated in accordance with the corrected steering torque Trqs1 is less influenced by the individuality of the magnetic sensor 62 and magnetic flux generated from the exciting coil of the clutch 12. Driving the reaction motor 26 in accordance with the target reaction torque Trqr1 applies, to the steering wheel 10, a suitable steering reaction responsive to an operation performed on the steering wheel 10. Consequently, irrespective of whether the clutch 12 is in the engaged state or the disengaged state, this embodiment provides improved steering feel to the driver.

(2) The clutch 12 is maintained in the disengaged state when the exciting coil of the clutch 12 is energized, and the clutch 12 is maintained in the engaged state when energization of the exciting coil of the clutch 12 is stopped. A steering mechanism may include a clutch configured to enter an engaged state when the exciting coil of the clutch is energized and enter a disengaged state when energization of the exciting coil is stopped. Unlike such a clutch, the clutch 12 would enter the engaged state where the steering shaft 22 serving as a power transmission path is mechanically connected, if the exciting coil of the clutch 12 is unintentionally de-energized. This enables the driver to manually steer the vehicle and thus further increases security of the steering mechanism.

(3) Because the amount of energization to the exciting coil of the clutch 12 by the clutch control circuit 86 is constant, a change in magnetic flux when the clutch 12 is switched between the engaged state and the disengaged state is also constant. This means that a change in the voltage signal Vt output from the magnetic sensor 62 is also constant, and a change in the steering torque Trqs calculated by the voltage torque conversion circuit 87 is also constant. Thus, the steering torque Trqs may be corrected by the correction circuit 88a, with consideration given only to an offset correction involving adding the first correction value Td or the second correction value Te to the steering torque Trqs. In other words, unlike the case where the current passing through the clutch 12 changes, a correction to be made to the steering torque Trqs for a change in magnetic flux generated from the exciting coil of the clutch 12 does not involve considering a gain correction. Consequently, this embodiment simplifies calculations to be performed by the control apparatus 80.

A steering mechanism control apparatus according to a second embodiment of the invention will be described below. In the following description, components similar to those of the first embodiment are identified by the same reference signs for the sake of convenience.

A steering mechanism according to this embodiment is provided with no torque sensor 94 illustrated in FIG. 1. Because no torque sensor 94 is provided, the steering shaft 22 includes no torsion bar 22c. The steering wheel 10 and the clutch 12 are coupled to each other with the steering shaft 22.

Because no torque sensor 94 is provided, a steering angle sensor 100 is provided for the steering shaft 22 as indicated by the long dashed double-short dashed line in FIG. 1. The steering angle sensor 100 includes a magnetic sensor. The steering angle sensor 100 is configured to detect rotation of the steering shaft 22 so as to detect an actual steering angle θss that is an absolute rotation angle of the steering wheel 10.

As illustrated in FIG. 6, the functional configuration of the CPU 82 according to the second embodiment replaces the voltage torque conversion circuit 87 with a steering angle torque conversion circuit 97. The steering angle torque conversion circuit 97 calculates an estimated steering torque Trqs2 in accordance with the actual steering angle θss detected by the steering angle sensor 100. There is a correlation between the actual steering angle θss detected by the steering angle sensor 100 and a steering torque applied to the steering shaft 22. Accordingly, the estimated steering torque Trqs2 is estimated in accordance with the actual steering angle θss detected by the steering angle sensor 100.

This embodiment will be described on the assumption that, with the clutch 12 in the disengaged state, magnetic flux generated from the exciting coil of the clutch 12 is applied to the steering angle sensor 100, and the actual steering angle θss detected by the steering angle sensor 100 is influenced by the magnetic flux generated from the exciting coil of the clutch 12.

The memory 84 according to the second embodiment stores a first correction value θd instead of the first correction value Td and stores a second correction value θe instead of the second correction value Te. The first correction value θd and the second correction value θe are set with a view to reducing or eliminating deviation of the steering torque relative to the zero point. The first correction value θd is a correction value to offset the zero point of the steering torque when the clutch 12 is in the engaged state, i.e., when no magnetic flux enters the steering angle sensor 100 from the clutch 12. The second correction value θe is a correction value to offset the zero point of the steering torque when the clutch 12 is in the disengaged state, i.e., when magnetic flux generated by energizing the exciting coil of the clutch 12 is applied to the steering angle sensor 100. The two correction values are set for the reasons described below.

Energization of the exciting coil of the clutch 12 may cause generation of magnetic flux from the exciting coil, and the magnetic flux may be applied to the steering angle sensor 100. In such a case, the actual steering angle θss detected by the steering angle sensor 100 changes owing not only to the individuality of the magnetic sensor of the steering angle sensor 100 but also to influence of the magnetic flux from the exciting coil. When the exciting coil of the clutch 12 is not energized, the actual steering angle θss deviates relative to its zero point owing to the individuality of the magnetic sensor of the steering angle sensor 100. Thus, the amount of deviation of the steering torque relative to the zero point when magnetic flux is applied to the steering angle sensor 100 differs from the amount of deviation of the steering torque relative to the zero point when no magnetic flux is applied to the steering angle sensor 100. Accordingly, the estimated steering torque Trqs2 is preferably corrected in accordance with the on/off state of the clutch 12.

Figure 7:
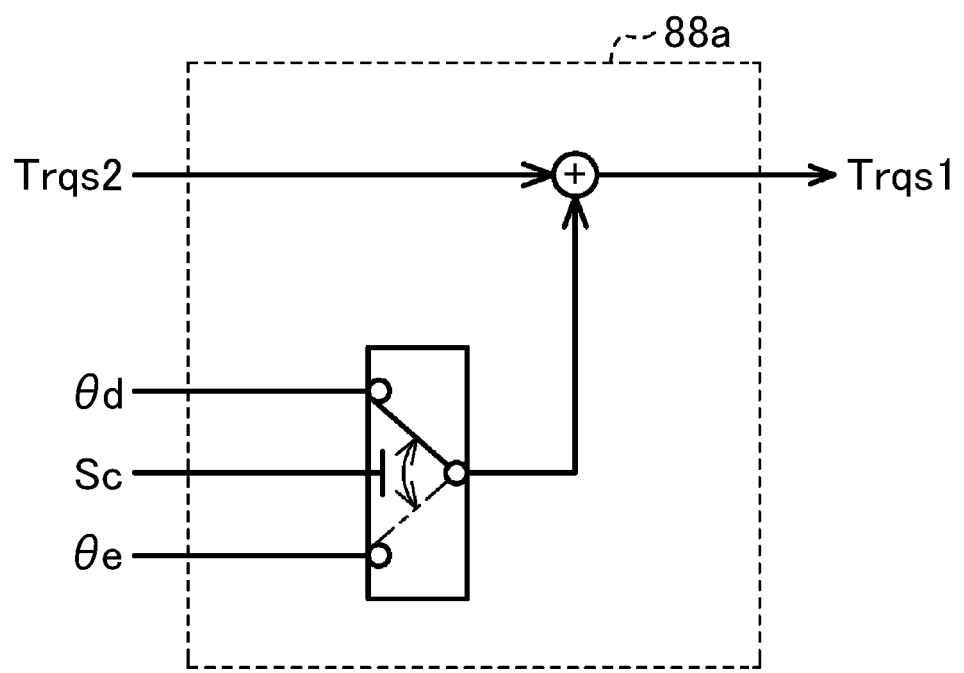
FIG. 7 is a block diagram illustrating the functional configuration of a correction circuit according to the second embodiment.

As illustrated in FIG. 7, the correction circuit 88a according to the second embodiment selectively uses the first correction value θd and the second correction value θe, stored in the memory 84, in accordance with the electric signal Sc generated on the basis of the operating state of the clutch 12.

For example, when the clutch 12 is in the engaged state, the correction circuit 88a uses the first correction value θd. In this case, the correction circuit 88a adds the first correction value θd to the estimated steering torque Trqs2 calculated by the steering angle torque conversion circuit 97. When the clutch 12 is in the disengaged state, the correction circuit 88a uses the second correction value θe. In this case, the correction circuit 88a adds the second correction value θe to the estimated steering torque Trqs2 calculated by the steering angle torque conversion circuit 97.

Selectively using the first correction value θd and the second correction value θe in accordance with the operating state of the clutch 12 suitably corrects the estimated steering torque Trqs2, calculated by the steering angle torque conversion circuit 97, in accordance with the operating state of the clutch 12. Thus, the second embodiment achieves effects similar to the effects (1) to (3) of the first embodiment.

Where technically possible, the first and second embodiments may be modified as described below.

Although the CPU 82 according to the first embodiment is provided with the voltage torque conversion circuit 87, the invention is not limited to this configuration. In one example, the torque sensor 94 may be provided with an integrated circuit (IC) having the functions of the voltage torque conversion circuit 87, so that the torque sensor 94 converts the voltage signal Vt, generated by the magnetic sensor 62, into the steering torque Trqs.

Figure 8:
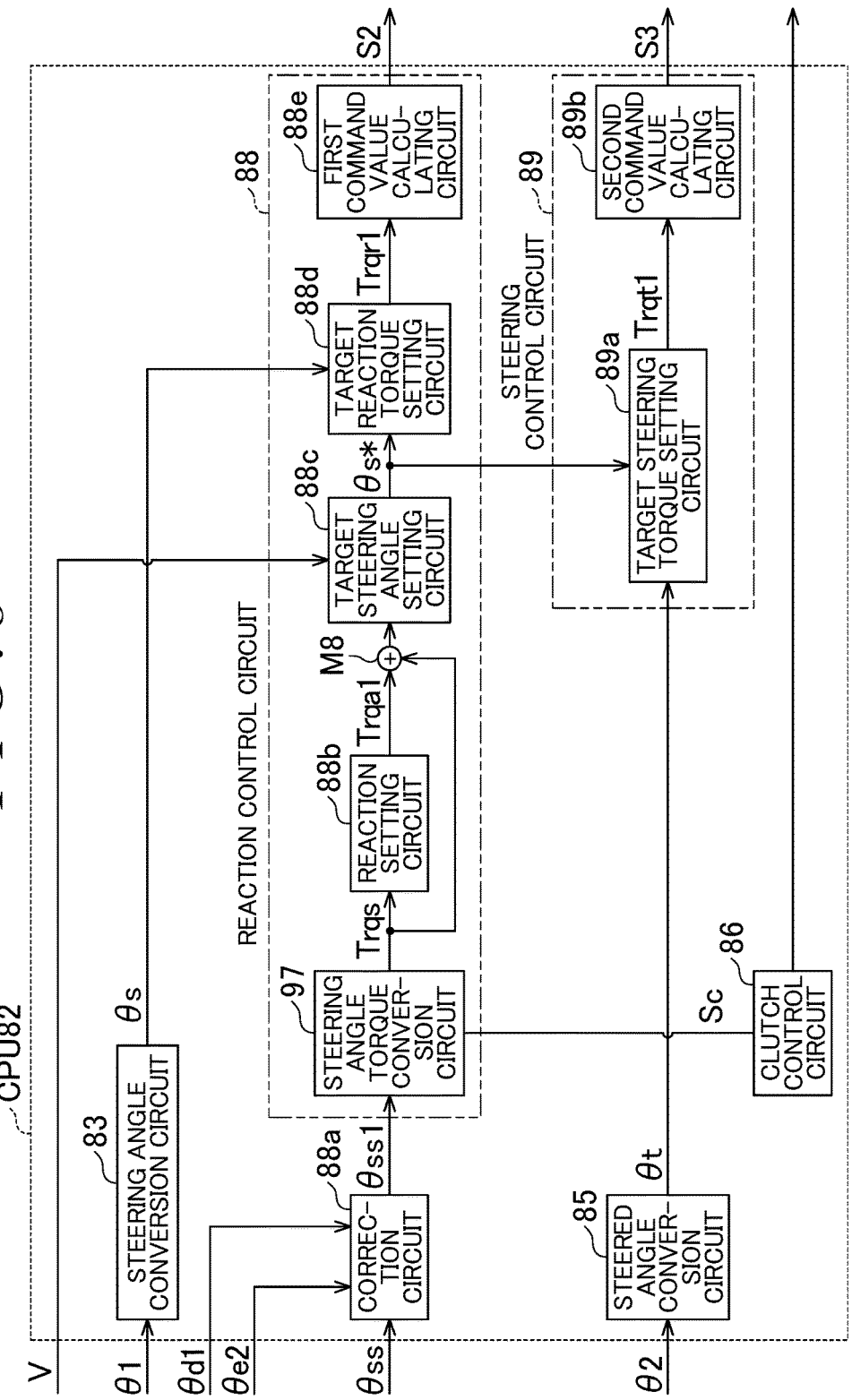
FIG. 8 is a block diagram illustrating the functional configuration of a control apparatus according to an alternative embodiment of the invention.

In the first embodiment, the correction circuit 88a is provided between the voltage torque conversion circuit 87 and the reaction setting circuit 88b. In the second embodiment, the correction circuit 88a is provided between the steering angle torque conversion circuit 97 and the reaction setting circuit 88b. The invention, however, is not limited to these configurations. In one example, the correction circuit 88a may be provided between the target steering angle setting circuit 88c and the target reaction torque setting circuit 88d of the reaction control circuit 88. In this case, a zero-point correction may be made not to the steering torque Trqs or the estimated steering torque Trqs2 but to the target steering angle θs* calculated by the target steering angle setting circuit 88c. In another example, the correction circuit 88a may be provided between the magnetic sensor 62 and the voltage torque conversion circuit 87. In this case, a zero-point correction is made not to the steering torque Trqs but to the voltage signal Vt generated by the magnetic sensor 62. Note that when a zero-point correction is made to the target steering angle θs* or the voltage signal Vt, the first and second correction values stored in the memory 84 are appropriately set in accordance with the object to be corrected. In still another example, the correction circuit 88a may make a zero-point correction to the actual steering angle θss. As illustrated in FIG. 8, this example involves interchanging the correction circuit 88a and the steering angle torque conversion circuit 97 of the CPU 82 according to the second embodiment, so that the correction circuit 88a makes a zero-point correction to the actual steering angle θss so as to calculate a corrected actual steering angle θss1. Note that when a zero-point correction is made to the actual steering angle θss, a first correction value θd1 and a second correction value θe2 stored in the memory 84 are appropriately set in accordance with the actual steering angle θss to be corrected.

In the first embodiment, the reaction motor 26 is controlled in accordance with the voltage signal Vt and the steering angle θs. In the second embodiment, the reaction motor 26 is controlled in accordance with the actual steering angle θss and the steering angle θs. The invention, however, is not limited to these configurations. In one example, controlling the reaction motor 26 may involve use of a vehicle speed signal. As illustrated in FIG. 8, the target steering angle setting circuit 88c may read a vehicle speed V detected by a vehicle speed sensor 110 (indicated by the long dashed double-short dashed line in FIG. 1) so as to calculate the target steering angle θs*. In this case, the target steering angle setting circuit 88c stores a vehicle model expression to associate the target steering angle θs* with a value output from the adding circuit M8. For example, coefficients used in the vehicle model expression, such as a coefficient of viscosity and a coefficient of inertia, are variably set in accordance with the vehicle speed V. In other words, the target steering angle θs* responsive to the vehicle speed V is suitably calculated. The reaction motor 26 is thus controlled in accordance with the suitable target steering angle θs*, resulting in more suitable reaction control.

In the configuration illustrated in FIG. 8, the target steering angle θs* is calculated in accordance with the actual steering angle θss detected by the steering angle sensor 100 and the vehicle speed V detected by the vehicle speed sensor 110. The invention, however, is not limited to this configuration. In one example, the target steering angle θs* may be calculated in accordance with the steering angle θs calculated by the steering angle conversion circuit 83 and the vehicle speed V detected by the vehicle speed sensor 110. In this case, no steering angle sensor 100 is provided, and the correction circuit 88a is configured to read the steering angle θs calculated by the steering angle conversion circuit 83. The first and second correction values stored in the memory 84 in this case are appropriately set in accordance with the steering angle θs to be corrected.

Suppose that the rotation angle sensor 92 includes a magnetoelectric device, such as a Hall sensor, in the first and second embodiments. In this case, the rotation angle sensor 92 may also be influenced by magnetic flux generated from the exciting coil of the clutch 12. This means that the rotation angle θ1 detected by the rotation angle sensor 92 is influenced by the magnetic flux. Thus, the target reaction torque Trqr1 calculated on the basis of the rotation angle θ1 is influenced by the magnetic flux generated from the exciting coil of the clutch 12. To cope with this, the correction circuit 88a may be configured to correct the rotation angle θ1 detected by the rotation angle sensor 92 or a correction circuit to correct the rotation angle θ1 may be additionally provided. Note that the first and second correction values stored in the memory 84 in this case are appropriately set in accordance with the rotation angle θ1 to be corrected.

Although the correction circuit 88a is configured to make an offset correction in the first and second embodiments, the invention is not limited to this configuration. In one example, when the amount of energization to the exciting coil of the clutch 12 changes, a gain variably set in accordance with the amount of energization may be used to make a gain correction. Specifically, the steering torque influenced by magnetic flux generated from the exciting coil of the clutch 12 is multiplied by a gain correction value. Setting the gain correction value involves experimentally determining how much the steering torque deviates relative to its zero point when the clutch 12 is in the engaged state and how much the steering torque deviates relative to its zero point when the clutch 12 is in the disengaged state. A gain correction made using the gain correction value set in this manner results in an increase in accuracy of the correction made by the correction circuit 88a.

The correction circuit 88a illustrated in FIG. 4 may be provided with a filter (e.g., a rate limiter) that follows an adder to add the first correction value Td or the second correction value Te to the steering torque Trqs. The correction circuit 88a illustrated in FIG. 7 may be provided with a filter (e.g., a rate limiter) that follows an adder to add the first correction value θd or the second correction value θe to the estimated steering torque Trqs2. Thus, a change in the corrected steering torque Trqs1 calculated by the adder will be slight. Consequently, a change in the steering reaction resulting from a correction made to the steering torque will be slight. This provides improved steering feel to the driver.

In the first embodiment, the reaction motor 26 and the steering motor 56 are both controlled in accordance with the voltage signal Vt detected by the torque sensor 94. In the second embodiment, the reaction motor 26 and the steering motor 56 are both controlled in accordance with the actual steering angle θss detected by the steering angle sensor 100. The invention, however, is not limited to these configurations. In one example, with the clutch 12 in the engaged state, either one of the reaction motor 26 and the steering motor 56 may be used to control the steering mechanism.

What is claimed is:

1. A control apparatus for controlling a steering mechanism, the steering mechanism including
    an electromagnetic clutch to connect and disconnect a power transmission path between a steering wheel and a steered wheel in response to whether power is supplied to the electromagnetic clutch,
    a reaction motor to generate a steering reaction, the steering reaction being a torque to be applied to a portion of the power transmission path between the steering wheel and the electromagnetic clutch in a direction opposite to a steering direction, and
    a steering motor to generate a steering force, the steering force being power to be applied to a portion of the power transmission path between the electromagnetic clutch and the steered wheel so as to steer the steered wheel,
    the control apparatus comprising:
    a plurality of control circuits to control supply of power to each of the electromagnetic clutch, the reaction motor, and the steering motor, the plurality of control circuits being configured to calculate a current command value for at least one of the reaction motor and the steering motor in accordance with a quantity of state indicative of a steering state of the steering wheel magnetically detected by a sensor provided for the steering mechanism; and
    a memory storing a first correction value set so as to reduce deviation of the quantity of state relative to a zero point of the quantity of state when the electromagnetic clutch is in an engaged state, and a second correction value set so as to reduce deviation of the quantity of state relative to the zero point of the quantity of state when the electromagnetic clutch is in a disengaged state, wherein
    the plurality of control circuits include a correction circuit to correct the quantity of state using the first correction value when the electromagnetic clutch is in the engaged state, and correct the quantity of state using the second correction value when the electromagnetic clutch is in the disengaged state.

2. The control apparatus according to claim 1, wherein the electromagnetic clutch enters the disengaged state when power is supplied to the electromagnetic clutch, and enters the engaged state when supply of power to the electromagnetic clutch is stopped.

3. The control apparatus according to claim 2, wherein the second correction value is set in accordance with an amount of deviation of the quantity of state relative to the zero point of the quantity of state, the deviation being caused by influence of magnetic flux on the sensor, the magnetic flux being generated by supply of power to the electromagnetic clutch.

4. The control apparatus according to claim 1, wherein the quantity of state is a steering torque applied to a steering shaft through the steering wheel, the steering shaft being an element of the power transmission path.

5. The control apparatus according to claim 1, wherein the quantity of state is a steering angle applied to a steering shaft through the steering wheel, the steering shaft being an element of the power transmission path.

6. The control apparatus according to claim 4, wherein the sensor is a torque sensor to generate an electric signal responsive to the steering torque, and
the plurality of control circuits include a conversion circuit to calculate the steering torque in accordance with the electric signal generated by the torque sensor.

7. The control apparatus according to claim 4, wherein
the sensor is a steering angle sensor to detect a steering angle, the steering angle being a rotation angle of the steering shaft, and
the plurality of control circuits include a conversion circuit to calculate the steering torque in accordance with the steering angle detected by the steering angle sensor.

8. The control apparatus according to claim 1, wherein
an amount of energization to the electromagnetic clutch is constant, and
the correction circuit is configured to correct the quantity of state by adding the first or second correction value to the quantity of state.

\* \* \* \* \*